(12) United States Patent
Pagaza-Melero

(10) Patent No.: US 8,283,035 B2
(45) Date of Patent: Oct. 9, 2012

(54) PROCESS FOR OBTAINING RUBBER PELLETS FROM USED TYRES

(76) Inventor: Gerardo Pagaza-Melero, Mexico (MX)

( * ) Notice: Subject to any disclaimer, the term of this patent is extended or adjusted under 35 U.S.C. 154(b) by 0 days.

(21) Appl. No.: 12/759,330

(22) Filed: Apr. 13, 2010

(65) Prior Publication Data

US 2010/0196715 A1  Aug. 5, 2010

Related U.S. Application Data

(62) Division of application No. 11/914,375, filed as application No. PCT/IB2006/000861 on Apr. 12, 2006, now Pat. No. 7,757,978.

(30) Foreign Application Priority Data

May 11, 2005  (MX) ................... PA/a/2005/005042

(51) Int. Cl.
*B32B 5/66* (2006.01)
(52) U.S. Cl. ............... 428/402; 428/403; 241/1; 241/3; 241/14; 241/15
(58) Field of Classification Search .................. 428/402, 428/407; 241/1, 3, 14, 15
See application file for complete search history.

(56) References Cited

U.S. PATENT DOCUMENTS

| 4,363,450 | A | * | 12/1982 | Schmidt | 241/24.12 |
| 4,925,113 | A | * | 5/1990 | Wissman et al. | 241/101.4 |
| 5,443,567 | A |   | 8/1995 | Pruett |  |
| 5,482,215 | A | * | 1/1996 | Veres | 241/1 |

FOREIGN PATENT DOCUMENTS

| DE | 4416155 A1 | 11/1995 |
| EP | 1305147 B1 | 5/2003 |
| ES | 2153244 B1 | 2/2001 |
| WO | 02090060 A2 | 11/2002 |

\* cited by examiner

*Primary Examiner* — Leszek Kiliman
(74) *Attorney, Agent, or Firm* — Browdy and Neimark, PLLC

(57) ABSTRACT

A process for obtaining rubber pellets from used tires is described, the process comprises a series of steps which take account of the structure of a tire, and among which are mainly: collecting used tires having a tread and lateral faces, in which the tread includes an inner layer and an outer layer; and each lateral face includes a flange at the inner edge thereof; separating the tread from the lateral faces; cutting the tread transversely through the inner layer and the outer layer in order to form a strip from the tread; cutting the strip in order to form pellets therefrom; detaching the flange from the separated lateral faces; and cutting the flange-less lateral faces in order to form pellets therefrom.

6 Claims, 3 Drawing Sheets

PROCESS FOR OBTAINING RUBBER PELLETS FROM USED TYRES

CROSS-REFERENCE TO RELATED APPLICATIONS

The present application is a divisional of application Ser. No. 11/914,375, filed Jul. 2, 2008, which is a 371 national phase of international application PCT/IB06/00861, filed Apr. 12, 2006, which claims priority of Mexican patent no. PA/A/2005/005042, filed May 11, 2005. The entire contents of the prior applications are incorporated herein by reference.

FIELD OF THE INVENTION

The present invention relates to the separation and cutting techniques for the different parts constituting a tyre, and more particularly, the invention is related to a process for obtaining rubber pellets from used tires.

BACKGROUND OF THE INVENTION

Currently, due to the constant growth of vehicles, the number of used tyres has been increasing through years. It is estimated that in Mexico 25 millions of tyres are disposed yearly and that in the U.S. about one tyre per habitant, therefore constituting one of the acutest pollution problems of the last few years, moreover taking into account that storing, destroying or finding a practical use to the large volumes of used tyres represents a great complexity. One main reason for this problem is due to the physicochemical properties the tyres acquire when subjected to vulcanization, making their elimination, recycling or transformation very complicated.

In Mexico, most of the used tyres normally may be found in streets, breeding grounds, open sky garbage dumps and in few cases in landfills. Then, these deposits faster become a health problem, since vermin such as mice and mosquitoes are developed therein.

Recently, the Cement industry has been making use of used tyres as fuel for their furnaces, since tyres are mainly formed by hydrocarbons thus containing a very similar heat capacity to that of fossil fuels employed in this industry, or even higher than that of carbon. Tyres are incinerated at temperatures about 1450 C, which according to said industry, reaches a complete combustion without residues as soot and other pollutants. However, nowadays only a limited amount of tyres for such purposes is allowed to be employed.

Another application for used tyres has been as fillers in highways and bridges slopes, but this use is reduced due to the physical and chemical properties of tyres.

Regarding tyre recycling, there are technologies to recover the main tyre materials form which they are manufactured, in other words, rubber, polymeric and steel fibers and cords. These recovered materials are employed mainly to make new tyres, making carpets, waterproofs, cast steel, rubber and cork agglomerates, shoe soles, etc, in addition, old tyres may be again vulcanized with new rubber. In tyre recycling, same are split, cut or ground to obtain particles, strips, sheets or pellets which may be incorporated in the above mentioned products and processes.

However, recycling is a complicated process due to the particular tyre structure in which the polymeric and steel cords are inside and between the rubber layers, which makes it not easy nor direct to obtain particles having a homogeneous structure.

In order to clearly explain the above, it is convenient to point out that a tyre has a structure that is defined by two main parts: the tread which contacts the pavement and the lateral faces allowing a tyre to be mounted on a rim.

Related to the above, the tread is in turn constituted by an inner layer and an outer layer or tread bottom, the last part making contact with the pavement. The inner layer is formed mainly by a carcass or frame having inside a sealing rubber layer; rubber coated polymeric fiber cords and depending on the type of tyre, balancing belts. On the other hand, the outer layer or tread bottom is essentially comprised by rubber, this outer layer is provided with bars, groves, flutings and shoulders, which form the drawing of the tyre.

Describing in more detail the inner layer, the carcass or frame is conformed in its most inner part by the sealing rubber layer, which acts as an air restrainer because it is airtight. Over the sealing rubber layer are located the cords of polymeric materials, such as rayon, polyester, nylon or steel being covered by rubber in order to avoid any friction therebetween. Finally, in the casing most outer part and over the polymeric or metallic cord layers are optionally located the balancing belts, which main purpose is to provide balance and uniformity to the tread when the tyre is rotating at high speeds, thus contributing to the tyre strength, less wearing, traction and driving. Commonly, the balancing belts are made from steel, which provides strengthening and balancing to the tread without adding much weight to the tyre.

Referring now to the second main part forming the tread, in other words, the outer layer or tread bottom, it may be noted that the grooves provided in said outer layer are designed to let water and residues to run off, cooling the tyre, traction generation, and to prevent a vehicle lateral slipping. In addition, the grooves are so designed to remove noise emission caused by the air conducting. On the other hand, the flutings included on the tread bottom work to increase the refrigeration or cooling of the tyre, in addition, flutings contribute to the traction capacity of the tyre. Meanwhile, the shoulders join the tread to the lateral faces; the shoulders are designed taking account of the bending of the lateral faces, resulting in a perfect contact of the tread on the pavement. Furthermore, the shoulders aid the weight transfers over the tyre, when a vehicle passes through curves.

On the other hand, as mentioned above, the second basic structure of a tyre are formed by lateral faces, each one of them having a flange forming an inner ring thereof. The lateral faces of the tyre are attached to the tread by the shoulders and are composed by rubber compounds with high flexural fatigue strength; in addition, the lateral faces may have inside thereof steel cords in order to provide higher strength.

In turn, the flange is formed by ring-shaped steel wires. The wires are copper-coated to avoid oxidation and, in addition, the cords are individually isolated by rubber compounds to prevent friction therebetween. The flange acts to anchor the tyre to the rim, the flange should have a high breaking strength, such that the flange is filled with a hard rubber compound to overcome the severity of the tyre mounting. Upon manufacturing of a tyre, the flanges are attached to the lateral faces while assembling the tyre, and further, they become totally bonded by the vulcanization process.

Once having explained the basic structure of a tyre, it is important to mention that machines allowing to separate the two main parts comprising a tyre are disclosed in the prior art, such as the machine of the Mexican patent 188,444 which belongs to the same inventor of the process being described in the instant document. Said patent is related to a tyre cutting machine, which makes it possible to efficiently separate the lateral faces from the tread, thus decreasing the volume occupied by the used tyres. However, this patent does not mention how the separated parts may be processed in order to obtain homogeneous particles or pellets capable of being recycled with the aforementioned processes and products.

Likewise, belonging to the prior art is the Mexican patent 160,377, disclosing a machine conceived to cut used tyres, said machine incorporates an structure having a cylindrical anvil roller, rotatably mounted thereon. Further, the machine employs, in the structure, a pair of knife rollers that rotate in parallel axes to the anvil roller rotation axis, said knife rollers being angularly spaced apart to each other and to the anvil roller axis, such that the tyres pass through the anvil roller between the knife rollers, thus obtaining rhombus shaped tyre cuts almost having a quadrangular shape. However, like other existing machines, the '377 machine does not take account the structure of the tyre, since tyres are feed to the machine as a whole, resulting in a high power consumption, besides to the fact that the rubber rhombus thus obtained are not uniform, in such a manner that cords and fibers protrude from the rhombus which may harm the personnel working with them.

Another case is that of the Mexican Patent No. 160,376 which describes a similar machine to that in the 160,377 patent, this machine comprises an anvil roller and a knife roller rotating about the axis parallel to the anvil roller rotating axis. Likewise, this machine cut the tyre in pieces without making a difference nor obtaining the maximum benefits from the different parts constituting the tyres.

Another important prior art document, is the Mexican Patent Application No. 9401943, which describes a machine consisting of a pair of platforms to place the tyre wherein the tyre rubber is cut through high pressure fluid cutting operations, however, the inconvenience with this type of machines is that operating a highly pressured fluid is highly expensive, besides to the inconvenience of accomplishing cleaning and recycling of the fluid used in the machine operation.

As may be noted, the prior techniques are limited to cut in a random manner the used tyre, or by means of highly expensive machines, and do not provide a logical sequence to obtain the greatest benefits from the tyre constituents, further, said techniques do not distinguish the particular manner in which the rubber, and polymeric and metal strings are related to each other in a tyre.

SUMMARY OF THE INVENTION

As a consequence form the above, the drawbacks and inconveniences of the prior art techniques and processes to recycle used tyres have been tried to be suppressed by providing a process for obtaining rubber pellets from used tyres, wherein said process may be carried out mainly through simple and organized operations allowing to obtain homogeneous rubber pellets capable or being rapidly manageable in a great variety of recycling applications.

Particularly, the process for obtaining rubber pellets from used tyres of the present invention comprises the following steps:

a) collecting used tyres having a tread and lateral faces, in which the tread includes an inner layer and an outer layer; each lateral face including a flange at the inner edge thereof;

b) separating the tread from the lateral faces;

c) cutting the tread transversely through the inner layer and the outer layer in order to form a strip of the tread;

d) cutting the tread obtained in the previous step in order to form pellets therefrom;

e) detaching the flange from the lateral faces which were separated in step (b); and f) cutting the flange-less lateral faces obtained in the previous step in order to form pellets therefrom;

With the above steps arrangement and sequence, rubber pellets from the tread and lateral faces are obtained. An advantage of this process is that the pellets thus obtained from the two main parts of the tyre have a regular shape and size, in addition, said rubber pellets include polymeric and metallic fiber or cords not protruding therefrom, so the subsequent management of the pellets does not represent any risk for the personnel working with them.

In a first preferred embodiment of the process of the present invention, the step (d) or "first pellet cutting step", is carried out in two steps, in the first of which longitudinal and parallel cuts are practiced over the strip of the tread, thus forming a first plurality of thinner strips, and in the second step, transversal and parallel cuts are accomplished over said thinner strips in order to form the rubber pellets. Processing in such sequential and organized manner the tread, represents the advantage of having a suitable size control for the formed rubber pellets and above all, the protrusion of the cords and fibers present in the tread from the formed rubber pellets is avoided.

In a second preferred embodiment, the process of the present invention comprises a further stage after separating the tread form the lateral faces in the separation stage (b), the further stage consisting on separating the tread outer layer form the inner layer, these layers being subsequently transversely cut in order to form an outer layer strip and an inner layer strip, which are then independently cut in the first pellet cutting step (d) thus forming rubber pellets from each one of said strips. This embodiment has the advantage of obtaining pellets essentially conformed by rubber from the tread outer layer.

In a third preferred embodiment, the process comprises a sieving step of the pellets obtained from the tread and lateral faces in the first pellet cutting step (b) as wells in the second pellet cutting step (f). The sieving has the object of separating and sorting the pellets according to their size, since some pellets may differ in shape and size, especially those formed from the lateral faces in the second pellet cutting step (f) due to the circular edged nature of the lateral faces.

As may be noted, it is an object of the present invention to provide a process for obtaining rubber pellets from used tyres, wherein the main parts of the tyre are being cut and separated in a systematic manner, facilitating the tyre recycling.

Another object of the invention is to provide a process for obtaining rubber pellets from used tyres, wherein pellets essentially made of rubber and rubber pellets containing in their inside fibers or strings may be obtained.

It is yet an object of the present invention to provide a process for obtaining pellets from used tyres, wherein the steps sequence represents a use in practice and a lower power consumption than feeding the whole tyre to the prior art machines.

BRIEF DESCRIPTION OF THE DRAWINGS

The novel aspects considered characteristic of the present invention, are set forth particularly in the appended claims. However, the operation, together with another objects and advantages thereof, will be better understood with the following detailed description of certain specific embodiments, when read related to the appended drawings, wherein:

DETAILED DESCRIPTION OF THE INVENTION

Figure 1:
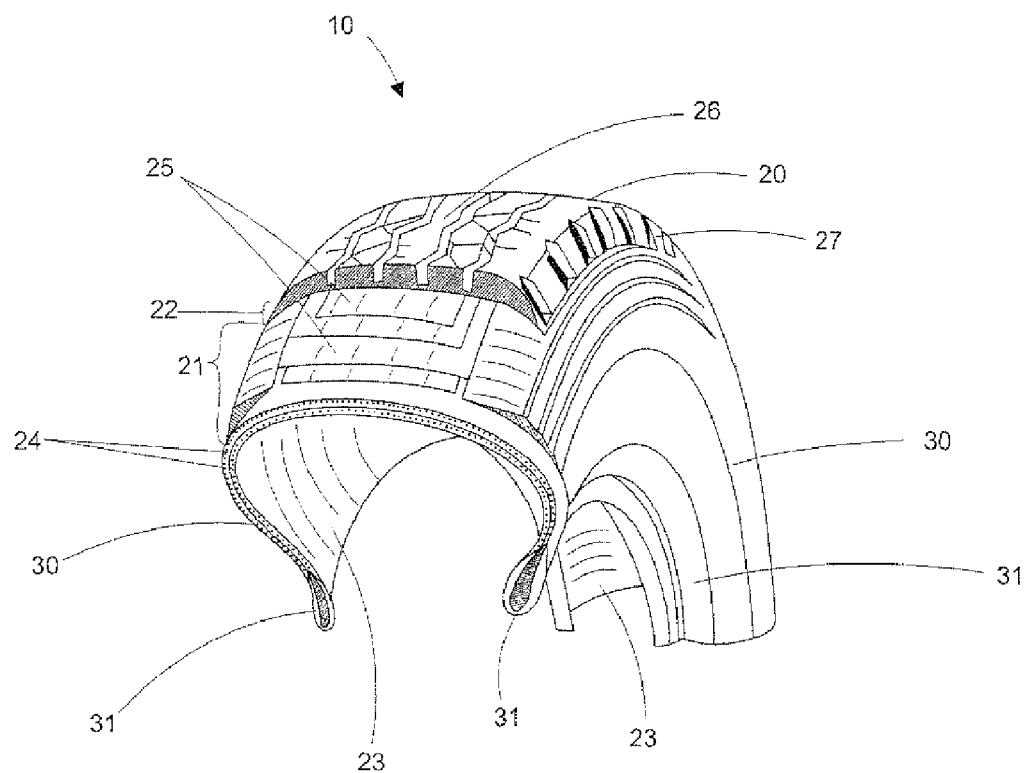
FIG. 1, is a perspective view of a transversely cut tyre portion.

In order to properly explain the advantages and organization of the process of the present invention, it is convenient to describe the general structure of a tyre, and therefore reference is made to FIG. 1, wherein a tyre 10 is shown which is constituted by a tread 20 contacting the pavement; and, lateral faces 30 for mounting the tyre 10 on a rim. In same FIG. 1, it may be seen that the tread 20 in turn comprises an inner layer 21 and an outer layer 22. In the inside of the first of these layers also known as carcass or frame, there is a sealing rubber layer 23 and over this rubber there are several layers 24 of rubber-coated polymeric fibers or metallic cords, in addition, in the tyre 10 shown in FIG. 1 balancing belts 25 are also seen.

Regarding the external layer 22, the same has a tread bottom 26 and shoulders 27 in order to connect the tread 20 with the lateral faces 30. In this aspect, it is noted that the inner edge of the lateral faces 30 is formed by a flange 31 allowing the tyre 10 to support the tyre 10 mounting and demounting operations on a rim.

Figure 2:
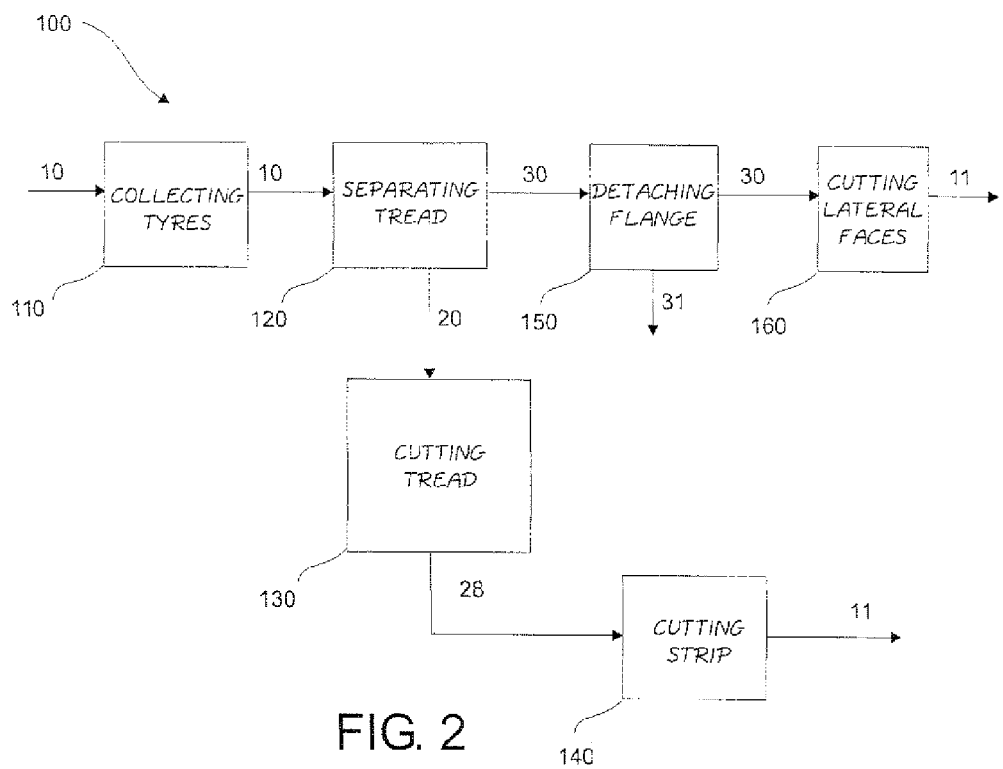
FIG. 2, is a flow chart of the process for obtaining rubber pellets from used tyres of the present invention.

Once having described the general conformation of a tyre, reference is made to FIG. 2, wherein a flow chart of the essential steps comprised by the process 100 of the present invention is shown, the process starts with a collecting step 110, wherein the used tyres 10 are collected, likewise, in this collecting step 110, used tyres 10 are preferably sorted according to their size, type and physical condition.

Further, in process 100, the separation step 120 is carried out, wherein the tread 20 is separated from the lateral faces 30 from each used tyre 10 collected. Once the main two parts of the tyre 10 have been separated in the separation step 120, the tread 20 is sent to the transversal cut step 130, wherein said tread 20 is transversely cut through its outer and inners layers in order to form a strip 28 from the tread. Then, the first pellet cutting step 140 takes place, wherein the tread strip 28 is cut in such a manner that rubber pellets 11 are formed therefrom.

Now then, process 100 also contemplates forming pellets from the lateral faces 30 being separated in the separation step 120, to achieve this said lateral faces 30 are processed in the detaching step 150, in which the flange 31 of each lateral face 30 is detached and disposed. Following the detaching step 150, the flange-less lateral faces 30 are received in a second pellet cutting step 160, wherein said lateral faces 30 are cut in such a manner that other rubber pellets 11 are formed.

Related to the above, the main reason because flange 31 is detached from each lateral face in the detaching step 150, is because the flange has a very complex structure that is very different from that of the remainder of the lateral face 30. In the flanges, there are copper and rubber coated steel wires, which would complicate carrying out the second pellet cutting step 160 thus forming rubber pellets 11 with two very different structures.

Otherwise, the rubber pellets 11 obtained from the tread strip 28 and flange-less lateral faces 30 share a very common structure therebetween, in other words, they include inside fibers and cords, as mentioned above the lateral faces 30 have steel cords like the tread, and then the pellets 11 may be mixed to be taken to the respective facilities to be recycled. In the process of the present invention, the rubber pellets 11 obtained from the first and second pellet cutting steps 140 and 160, respectively, have a preferred size of about 6.4 mm to about 50.8 mm. Further, they have a rhomboidal or quadrangular shape.

As may be understood from the disclosure related to FIG. 2, the separation step 120, the transversal cutting step 130, the first pellet cutting step 140, the detaching step 150 and the second pellet cutting step 160 include separation and cutting operations, such that said steps are carried out by means of cutting hand tools or cutting machines mechanically, hydraulically or electrically driven. For instance, cutting hand tools that may be used are shears, power shears, knives and blades. Meanwhile the cutting machines may be shearing machines or blade presses machines and cutting multi-discs machines. Specifically, the separation step 120 may be carried out using the machine described in the Mexican patent 188,444.

An important aspect to be mentioned is that, in the second pellet cutting step 160, longitudinal and transversal cuttings are performed simultaneously in a grid-like manner over the lateral faces 30 thus forming the rubber pellets 11. Of course, some of the rubber pellets 11 will have a circularly or rounded shaped due to the circular edge of the lateral faces 30, however, this case will be described a few paragraphs below.

Figure 3:
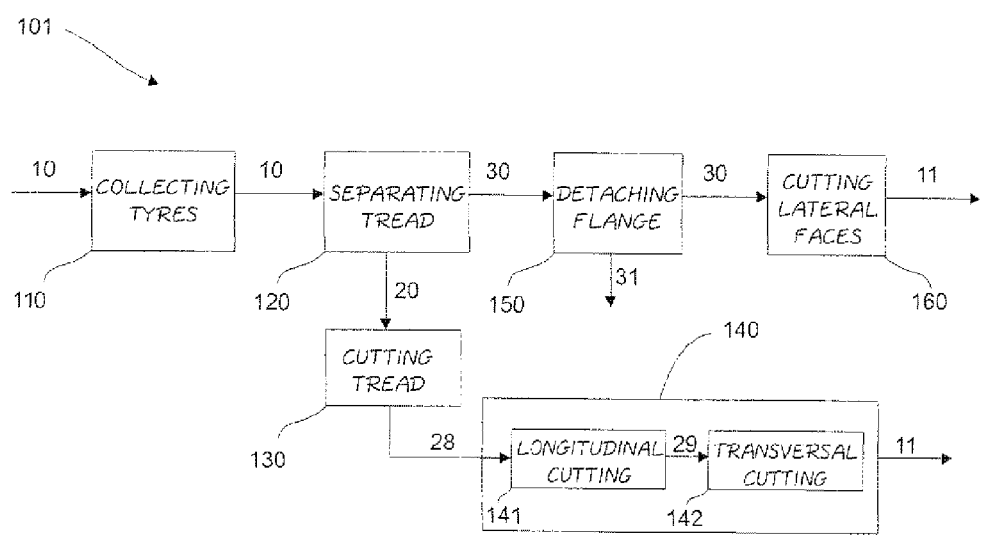
FIG. 3, is a flow chart of the process for obtaining rubber pellets from used tyres, according to a first specific embodiment of the present invention.

The present invention may be carried out according to specific embodiments, first of which is shown in FIG. 3, the process being referred to as 101, comprises all same steps as described in FIG. 1, in other words, comprises the step of collecting 110 used tyres 10; the separation step 120, wherein the lateral faces 30 are detached from the tread 20; the transversal cutting step 130 of the tread 20; the detaching step 150 of the flange 31; and the first and second pellet cutting steps 140 and 160, wherein the strip 28 from the tread and lateral faces 30 is cut in the form of rubber pellets 11. However, in this first preferred embodiment, the first pellet cutting step 140 is carried out in two stages, the first stage 141, wherein longitudinal and parallel cuts are accomplished to each other over the tread strip 28 entering said first pellet cutting step 140, such that a first plurality of thinner strips 29 are formed, and the second stage 142, wherein transversal and parallel cuts are accomplished to each other over said thin strips 29 in order to form the rubber pellets 11. Processing in such sequential and organized manner the tread strip 28, represents the advantage of having an accurate control over the size of the thus formed rubber pellets 11, and the protrusion of the strings and fibers being present in the tread out of the formed rubber pellets 11 is avoided.

Preferably, the first and second stages 141 and 142 are accomplished by cutting machines having a plurality of parallel cutting knives, blades or discs spaced apart one to each other.

In an alternative embodiment of the process, in the first pellet cutting step 140, transversal and parallel cuts to each other over the tread strip are initially accomplished in order to form a second plurality of strips having the same width to that of the tread, and thereafter, parallel cuts are accomplished to form the rubber pellets from this second plurality of strips. This embodiment also allows to have control over the formed pellets, however, considering aspects related to the handling of the tread strip 28, it is preferably to initially carry out the parallel cuts along said strip 28 as outlined in FIG. 3.

Figure 4:
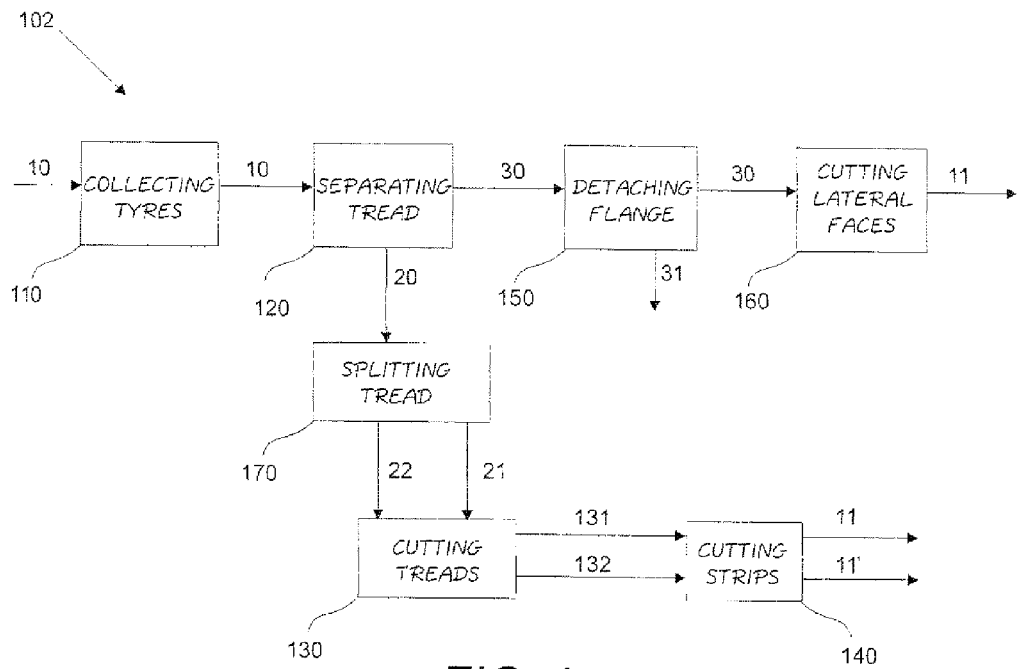
FIG. 4, is a flow chart of the process for obtaining rubber pellets from used tyres, according to a second specific embodiment of the present invention.

Referring now to FIG. 4, a second specific preferred embodiment of the process of the present invention is shown, the second embodiment, referred to as 102, as may be noted comprises the collecting step 110 of used tyres; the separation step 120, wherein the lateral faces 30 are detached from the tread 20; the transversal cutting step 130 of the tread 20; the detaching step 150 of the flange 31; and the second pellet cutting step 160, wherein the flange-less lateral faces 30 are cut in the form of rubber pellets 11. However, in the process 102 of this second embodiment, after the separation step 120, the tread 20 is subjected to a splitting step 170, wherein the inner layer 21 of the tread 20 is separated from the outer layer 22. Thereafter, said treads 21 and 22 are independently transversely cut in the transversal cutting step 130, in order to obtain a strip from the inner layer 131 and a strip from the outer layer 132, then these strips 131 and 132 are independently cut in the first pellet cutting step 140 thus obtaining rubber pellets 11 and 11', in which the rubber pellets 11 incorporate inside cords and fibers, while the rubber pellets 11' essentially consist of rubber.

Figure 5:
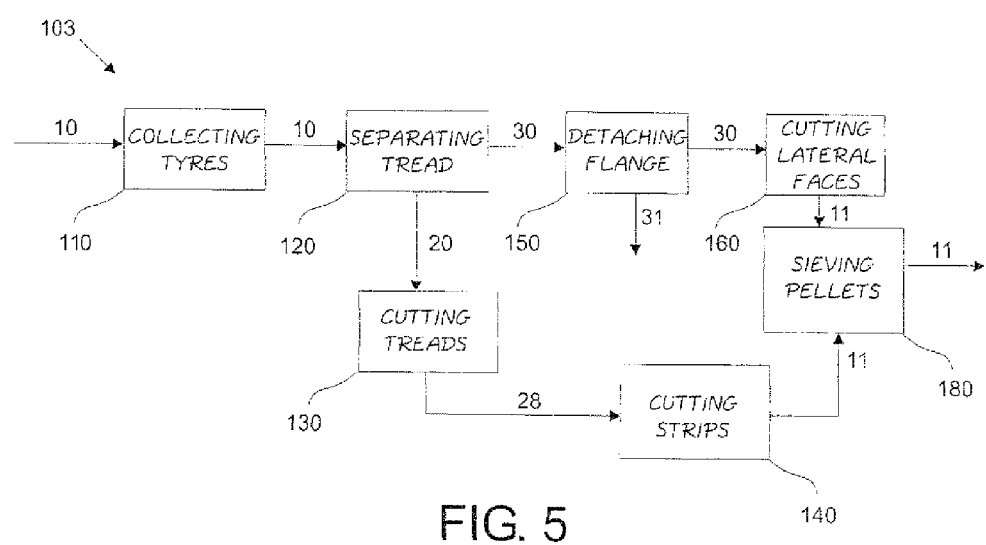
FIG. 5, is a flow chart of the process for obtaining rubber pellets from used tyres, according to a third specific embodiment of the present invention.

Finally, reference is made to FIG. 5, wherein a third specific embodiment of the process of the present invention is shown, this third embodiment referred to as 103, once more includes the collecting 110 step of used tyres 10; the separation step 120, wherein the lateral faces 30 are detached from the tread 20; the transversal cutting step 130 of the tread 20; the detaching step 150 of the flange 31; and the first and second pellet cutting steps 140 and 160, wherein the strip 28 from the tread and the lateral faces 30 are cut in the form of rubber pellets 11. However, taking account that the lateral faces are circularly-shaped and that in many used tyres 10 the tread 20 has an uneven surface wearing, the process 103 of this third embodiment comprises carrying out a sieving step 180, wherein the rubber pellets 11 form the first and second pellet cutting steps 140 and 160 are passed through meshes, screens or sieves in order to separate those pellets not having the preferred size of from about 6.4 mm to about 50.8 mm.

Although in the above description have been described and shown specific embodiments of the invention, it must be pointed out that there are several possible modifications, for instance, the cutting direction in the tread for obtaining the pellets may be varied, thus varying the form of the obtained pellets. Therefore, the present invention must not be limited for the set forth in the state of the art and by the appended claims.

What is claimed is:

1. Rubber pellets obtained from used tires by a process comprising:
    a) collecting used tires having a tread and lateral faces, in which the tread includes an inner layer and an outer layer, and each lateral face includes a flange at the inner edge thereof;
    b) separating the tread from the lateral faces;
    c) cutting the tread transversely through the inner layer and the outer layer in order to form a strip from the tread;
    d) cutting the strip obtained in the previous step in order to form pellets therefrom in two stages: i) in the first stage, making longitudinal and parallel cuts over the tread strip, thus forming a first plurality of thinner strips; and
    ii) in the second stage, making transverse and parallel cuts over the thinner strips in order to form the rubber pellets;
    e) detaching the flange from the lateral faces which were separated in step (b); and;
    f) cutting the flange-less lateral faces from step (e) in order to form pellets therefrom,
    wherein the rubber pellets obtained from the tread and the lateral faces have a size between 6.4 mm and 50.8 mm and have a regular quadrangular or rhomboidal shape.

2. Rubber pellets from used tires having a size between 6.4 mm and 50.8 mm wherein the pellets include polymeric and metallic fibers and cords therewithin which do not protrude from the pellets, and wherein the pellets have a regular quadrangular or rhomboidal shape.

3. Rubber pellets obtained from used tires by a process comprising:
    a) collecting used tires having a tread and lateral faces, in which the tread includes an inner layer and an outer layer, and each lateral face includes a flange at the inner edge thereof;
    b) separating the tread from the lateral faces;
    c) separating the tread outer layer from the inner layer;
    d) independently cutting the tread inner layer and the tread outer layer transversely therethrough in order to form strips from the tread inner layer and strips from the tread outer layer;
    e) independently cutting the strips obtained in step (d) in order to form pellets therefrom in two stages: i) in the first stage, making longitudinal and parallel cuts over the tread strips, thus forming a first plurality of thinner strips from the tread inner layer and a first plurality of thinner strips from the tread outer layer; and ii) in the second stage, making transverse and parallel cuts over the thinner strips in order to form rubber pellets from the thinner strips from the tread inner layer and rubber pellets from the thinner strips from the tread outer layer;
    f) detaching the flange from the lateral faces which were separated in step (b); and;
    f) cutting the flange-less lateral faces from step (e) in order to form pellets therefrom,
    wherein each of the rubber pellets obtained from the tread inner layer, the tread outer layer and the lateral faces have a size between 6.4 mm and 50.8 mm and have a regular quadrangular or rhomboidal shape.

4. Rubber pellets in accordance with claim 3, wherein the pellets obtained from the tread outer layer consist essentially of rubber.

5. Rubber pellets in accordance with claim 1, wherein the pellets include polymeric and metallic fibers and cords therewithin which do not protrude from said pellets.

6. Rubber pellets in accordance with claim 3, wherein the pellets obtained from the inner layer include polymeric and metallic fibers and cords therewithin which do not protrude from said pellets.

* * * * *